Sept. 11, 1934.  B. K. BROWN  1,973,559
NITRATION
Filed July 13, 1933
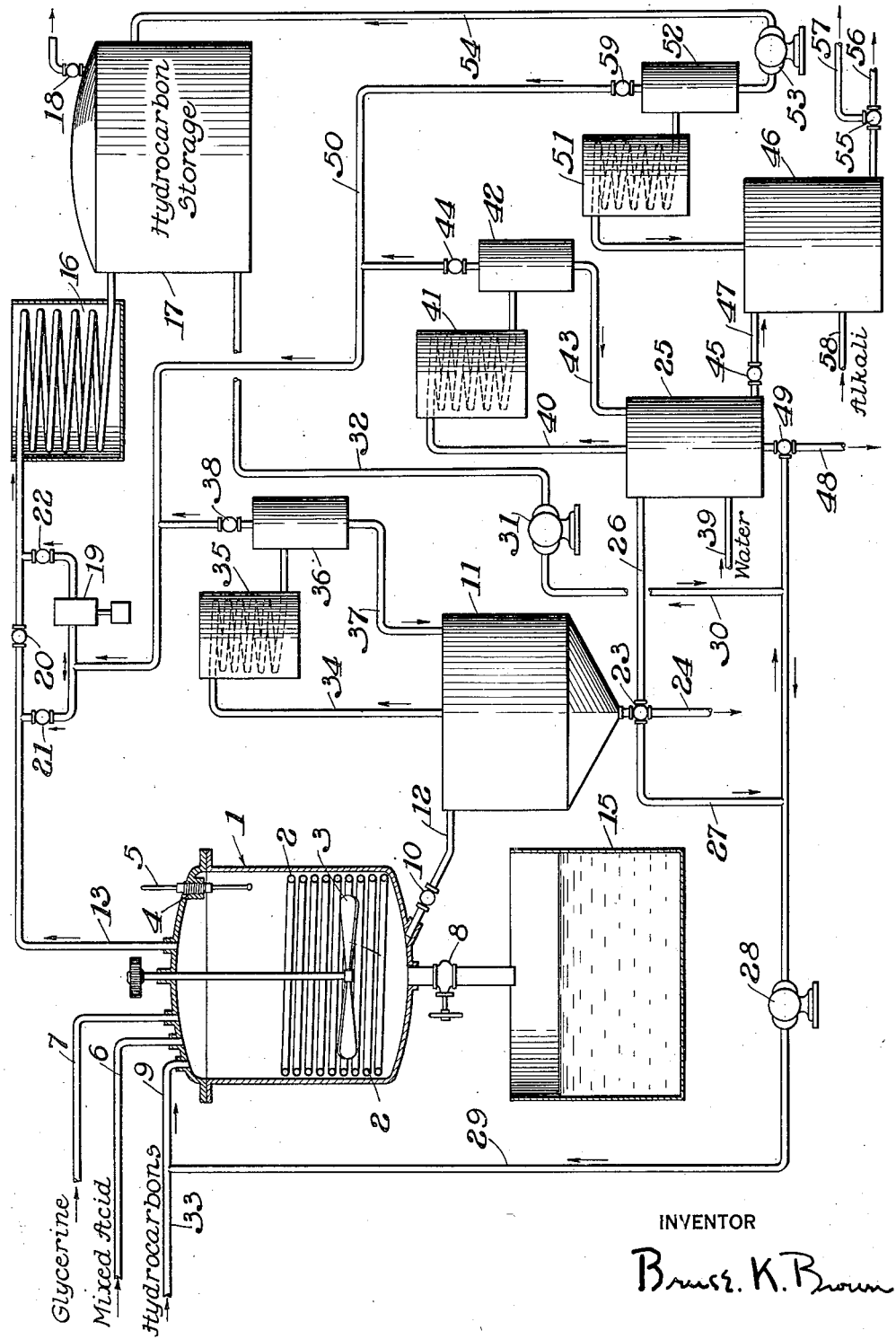
INVENTOR
Bruce K. Brown Patented Sept. 11, 1934

1,973,559

UNITED STATES PATENT OFFICE 1,973,559

NITRATION

Bruce K. Brown, Wilmette, Ill., assignor to Standard Oil Company, Chicago, Ill., a corporation of Indiana Application July 13, 1933, Serial No. 680,260

18 Claims. (Cl. 260—144)

This invention relates to nitration processes and it comprises processes wherein liquid polyhydroxy compounds, such as glycerine, the glycols, polymerized glycerine, glyceryl monochlorhydrin, and liquid mixtures thereof with sugar, are nitrated to form nitro compounds such as nitroglycerine, nitroglycols, and nitrated solutions of carbohydrates in the glycerine, the process being characterized by nitrating in intimate contact with a relatively low-boiling hydrocarbon which acts as an internal, direct-contact cooling medium to absorb the heat of the reaction and to keep the reaction temperature within limits of safety and high yields.

In the customary methods of making nitroglycerine, and similar nitro compounds such as nitrated glycols, and the like, many precautions are taken to insure safety of operation. It is not at all unusual to nitrate several hundred pounds of glycerine in a single charge, this yielding as much as 1500 pounds of nitroglycerine. It has long been appreciated that the temperature of the reaction must be under continuous, accurate control. This temperature is generally from 22° to 25° C. and extreme care is taken to insure that the temperature does not exceed this limit. Control of the reaction is usually accomplished by providing the reaction vessel with brine coils and running the glycerine into the mixed acids very slowly. Agitation is continuous and, in this country, agitation is by mechanical means. The agitator is operated by a small steam engine and means are also provided to run the agitator by man power in case the steam fails. Electric motors, are of course, excluded because of the danger of sparks in the vicinity of the nitro-glycerine. Agitation is for the purpose of mixing the glycerine with the acids but is also essential to prevent localized overheating. As the glycerine runs into the mixed acid, reaction starts immediately on the surface of each globule of glycerine and the heat liberated is quite considerable. This heat must be dissipated as quickly as possible, otherwise it may increase to the danger limit and a whole charge of nitroglycerine may be exploded because of localized heating in a relatively small portion of the mixture. The decomposition of the nitroglycerine is greatly accelerated by the presence of the acids. Acid-free nitroglycerine is much less sensitive to moderately elevated temperatures. The experienced nitroglycerine man recognizes rapid, dangerous decomposition, by the formation of fumes of red oxides of nitrogen. When it appears that the charge in the reaction vessel is getting out of control, the whole charge is dumped into a large volume of water maintained in a tank beneath the reaction vessel. Temperature control is thus perhaps the most important single factor in nitroglycerine manufacture and, as stated above, this control has hitherto been accomplished by the use of brine coils in the nitrator, by the rate of adding the glycerine, and by agitation.

I have now been able to simplify and improve temperature control in this art to such an extent that I can markedly increase the rate of adding the glycerine to the mixed acids and thus increase the production rate. I have been able to operate at slightly higher nitration temperatures without increasing side reactions; and with an entire avoidance of local overheating, I have been able to make a nitroglycerine requiring less extensive purification to free it of occluded acids.

I have found that the heat of the reaction can be absorbed by the use of low boiling hydrocarbons directly mixed in with the mixture of glycerine and acids and, provided an appropriate choice of hydrocarbons, or mixtures thereof, is exercised, I can control the temperature of the reaction mixture at all times and such control is entirely automatic so long as hydrocarbon is retained in the mixture. To put it another way, I utilize as cooling agents, either alone, or in conjunction with the customary brine coils, hydrocarbons having boiling points, or high vapor pressures, within the permissible temperature range of the reaction. These hydrocarbons are mixed with the glycerine and acids. Should localized heating develop during the course of the reaction some of the hydrocarbon is immediately volatilized, thus absorbing the heat, and the overheating checked before it has had any opportunity to exceed limits of safety.

Generally I use saturated aliphatic hydrocarbons; for example, normal pentane, boiling point 38° C., isopentane, boiling point 30° C., butane, boiling point 1° C., and other hydrocarbons, or mixtures thereof as will be more fully explained. It is best to use saturated aliphatic hydrocarbons since these have absolutely no tendency to react with the mixed acids at the low temperatures of the nitration reaction. My invention, however, is broad enough to include hydrocarbons other than those of the saturated aliphatic series provided the hydrocarbon chosen does not, at 25° C. to 30° C., or below, show any marked tendency to react with the strong mixed acids.

Nitroglycerine is but slightly soluble in hydrocarbon solvents. Generally this solubility is of the order of 1 to 2% at 20° C. This is a marked advantage in my process since practically all of the nitroglycerine may be readily separated from the hydrocarbon cooling agent by allowing the mixture to stratify. The hydrocarbon layer, containing a small quantity of nitroglycerine, is, after separation from the nitroglycerine layer, returned to the reaction vessel as will be described.

On the appended single sheet of drawing I have illustrated my process as adapted to the manufacture of nitro compounds such as nitroglycerine, nitroglycols, nitrated polymerized glycerine, nitrated mixtures of glycerine and sugar and nitrated chlorhydrin derivatives of glycerine. The manufacturing operations in making all of these compounds are almost identical and it will suffice if I refer to them broadly as nitroglycerine manufacturing operations. The following description is therefore not restricted to nitroglycerine per se.

A nitration kettle 1, is provided with the usual brine coils 2, agitator 3 and thermometer well 4, containing thermometer 5. Mixed acids (nitric and sulphuric) are charged in at 6 and glycerine at 7. Dump outlet and valve 8 is also provided at the bottom of the kettle. Inlet 9 is for the purpose of introducing hydrocarbon cooling agent and through outlet and valve 10 the contents of the kettle may be conveyed to a separator 11 by way of line 12. Cooling is obtained by evaporating a portion of the hydrocarbon cooling agent from kettle through line 13, valve 14, condenser coil 15 immersed in cooling bath 16 and thence returning the hydrocarbon to intermediate storage tank 17 which may be vented at 18 for the removal of uncondensible gases. Brine coils 2 furnish auxiliary cooling if required. If desired, kettle 1 can be operated under a slight vacuum by means of compressor 19. In this case valve 20 will be closed and valves 21 and 22 opened.

Beneath the reaction kettle emergency dump tank 15 is provided as usual in this art. This tank is always filled with water.

After the nitration is finished, the contents of the reaction kettle are conducted to separator 11 wherein the mixed acid, having a specific gravity of around 1.7 is separated from the upper layer of nitroglycerine. The acids are withdrawn through four-way valve 23 and sent to an after separation vessel, or to a recovery plant, by way of line 24. The impure nitroglycerine flows to a washing apparatus 25 by way of line 26 and the upper hydrocarbon layer, having a specific gravity greatly less than the nitroglycerine, is drawn off through line 27 and pumped, by means of pump 28 and line 29 back to the nitrator or reaction kettle. The returned hydrocarbon contains but little dissolved nitroglycerine and hence no hazards are involved in pumping it. Alternatively, the hydrocarbon layer from separator 11 can be recycled back to storage tank 18 by means of line 30, pump 31 and line 32. When hydrocarbon is needed for another nitration it can be introduced into kettle 1 from tank 17 by means of line 32, pump 31, line 30, pump 28, line 29 and inlet 9. Make-up hydrocarbon cooling agent can be supplied through pipe 33. This also serves as a quick and certain emergency method of introducing hydrocarbon for cooling purposes.

Separator 11 is also provided with a reflux arrangement comprising line 34, condenser 35, separator 36 and return line 37 to reflux and return any volatilized hydrocarbon. Vapors can be withdrawn from separator 36 through valve 38 and passed through valves 21 and 20 or compressor 19 and valve 22 back to the hydrocarbon recovery system, thereby cooling separator 11. It is desirable at this stage to keep the refrigerant in contact with the nitroglycerine since the nitroglycerine in contact with the acid is still a dangerous substance. When withdrawing nitroglycerine from separator 11 to be conducted to washer 25, it is best to withdraw about a third of the hydrocarbon layer along with the nitro compound and send both to washer 25. This insures that all of the nitroglycerine which has separated out goes to the washer and none of it, other than that dissolved in the hydrocarbon, is pumped back to the reaction kettle.

The separated nitroglycerine, together with the hydrocarbon cooling agent passes to washer 25 and is washed with water introduced through line 39. A reflux arrangement comprising line 40, condenser 41, separator 42, return line 43, and valve 44 is provided as in the case of separator 11. During the washing operation, any free acids occluded in the nitroglycerine or in the hydrocarbon are washed out. A valve 45, at the bottom of the washing apparatus, permits the nitroglycerine, as a separated bottom layer, to be withdrawn and sent to the alkali washing apparatus 46 by way of line 47. The middle or water layer is run to waste or acid recovery through line 48 by means of three way valve 49, and the top or hydrocarbon layer is then conducted back to the reaction vessel through valve 49, pump 28, line 29 and inlet 9 or back to storage tank 18 by means of pump 31.

The nitroglycerine introduced into washer 46 is washed therein with dilute sodium carbonate solution introduced through line 58 in accordance with the usual procedure. This washing operation is usually conducted at somewhat elevated temperatures, around 40° C. so that, at this temperature, any hydrocarbon retained in the mixture is volatilized out, advantageously under a slight vacuum, the vapors flowing through valve 59, line 50, pump 19 and valve 22, being condensed by condenser 16 and returning to tank 17. The bulk of the hydrocarbon passing off from washer 46 may be condensed in condenser 51, separated from the vapors in separator 52 and returned to tank 17 by means of pump 53 and line 54. Alternatively, the condensate may be returned at once to reaction kettle 1.

Neutral nitroglycerine flows out of the alkali washing apparatus by way of valve 55 and line 56 to storage and the wash liquor may be drawn off through line 57.

In the operation of the apparatus set-up described above, I measure out quantities of mixed acids and glycerine, observing the usual ratios to give the best results. These depend upon purity of the glycerine and strength of the acids. For example, the ratios can be 110 parts of glycerine, 300 parts of nitric acid of 93–94 percent monohydrate and 500 parts of sulfuric acid of 96 percent monohydrate. The mixed acids, at a temperature of 20° C. or less are charged into reaction kettle 1.

I then introduce about 500 parts of a hydrocarbon mixture boiling at about 30° C. or having a high vapor pressure at 25° to 30° C. This is five degrees higher than the usual permissible temperature limits. This hydrocarbon mixture may consist entirely of isopentane, or it may consist of a mixture of normal pentane and butane, or normal pentane alone (boiling point 38° C.). Although I prefer to use a hydrocarbon mixture boiling within the reaction temperatures chosen, I am not restricted to this. I can use hydrocarbons having high vapor pressures at these temperatures. Normal pentane is one such substance.

After the hydrocarbon cooling agent has been introduced, I advantageously flow cold brine through the cooling coils in the kettle. When I use the brine, my hydrocarbon "internal" refrigerant chiefly acts as a check to completely control the temperature and to prevent localized overheating. Less hydrocarbon can therefore be used. Alternatively I can dispense entirely with a cooling coil and rely on the hydrocarbon for complete refrigeration.

In either case, I next start the agitating device and maintain cooling conditions by evaporating hydrocarbon through line 13, liquid hydrocarbon being returned through inlet 9 as required to replace that evaporated. Then the glycerine is added slowly through inlet 6. I find that the glycerine can be added at a rate as much as fifty percent faster compared with ordinary processes because of the immediate chilling effect of the hydrocarbon refrigerant. Since the refrigerant is insoluble in the mixed acids, as is also the glycerine, all substances in the reaction kettle are mixed together by the agitator so that a sort of coarse emulsion or suspension of glycerine and hydrocarbon exists within the vessel. This means that the refrigerant, or a heat absorbing material, is in direct contact with glycerine at all times so that any localized overheating in the interior of the body of liquids remote from the cooling coils is at once corrected. This is a very important advantage. Moreover, volatilization of the hydrocarbon tends to stir the mixture and thus assists in heat dissipation.

When hydrocarbon is used as the refrigerant alone, quantities of it are vaporized and refluxed. Care should naturally be taken that the rate of reflux is sufficient to return the hydrocarbon almost immediately. In this case, it will be observed that the hydrocarbon really acts as a most efficient heat transfer medium, heat being conducted from the reaction to the reflux cooling fluid and condensed, cold hydrocarbon being continuously returned to the reaction vessel.

When the hydrocarbon refrigerant is used in conjunction with the ordinary brine coils, the capacity of the reflux condenser need not be so great. In this case, as stated above, the hydrocarbon acts as a temperature control, most of the cooling being done by the brine coils. Localized overheating is entirely overcome, however, although the actual cooling action of the hydrocarbon is thus more or less limited to localized overheating.

I can, of course, conduct the nitration at temperatures of 12° to 14° C. if desired, simply by an appropriate choice of hydrocarbons. For example I can use a mixture of tetra methyl methane, boiling at 9° C. and normal pentane. It is well known that lower nitration temperatures tend to lower side reactions but care must be taken that the temperature does not get much below 12° C. lest the nitroglycerine be frozen. I find it much more advantageous, however, to operate at usual nitration temperatures, generally 22° to 25° C. or slightly higher because the reaction rate is increased. As pointed out above, one of the advantages in my process is that with internal automatic cooling by means of volatile hydrocarbons in direct contact with the reaction mixture the tendency for side reactions is greatly reduced. These side reactions while dependent to some extent upon the purity of the glycerine, are nevertheless materially increased as the temperature increases unless adequate means are taken to prevent localized overheating.

After the nitration is finished, the nitroglycerine is purified in the usual way by washing with water and then with dilute sodium carbonate solution. My invention does not materially change these operations. I do, however, find that the nitroglycerine separates more rapidly, and cleaner, from the acid layer. This may in part be attributed to the fact that side reaction products are greatly lessened. Recovery of the hydrocarbon cooling agent involves no difficulties. Most of it is recovered as a liquid immiscible with the nitroglycerine layer. Small quantities of hydrocarbon flowing to the alkali washing apparatus are readily removed by distillation since the usual temperature in this stage is 40° C. or slightly higher. This is high enough to volatilize off any remaining hydrocarbon.

While I have more specifically described my process in relation to the manufacture of nitroglycerine, it will be obvious that the process steps are identical when making nitroglycols, when nitrating polymerized glycerine, and when nitrating various mixtures of glycerine and sugar. The only changes necessary are those connected with the ratios of mixed acids to material to be nitrated. These ratios are, however, well known in the art. In fact, my process does not modify ordinary nitroglycerine technique in any way other than in the cooling and temperature control of the nitration reaction.

In a modification of the above processes, I can conduct the nitration of glycerine under pressures slightly in excess of atmospheric. This is sometimes an advantage. For instance, I can use butane as the hydrocarbon cooling agent and conduct the nitration under a pressure of about 31 pounds per square inch absolute. At this pressure, the butane boils at about 20° C. a desirable nitration temperature. Butane alone cannot be used at atmospheric pressure when nitrating glycerine because its low boiling point, 1° C. would tend to freeze the nitroglycerine. In such cases, it is desirable to operate under pressures above atmospheric so as to increase the boiling point of the hydrocarbon. On the other hand, the nitroglycols have very low freezing points, considerably below 1° C. so that when nitrating glycols I can use butane as the cooling agent at ordinary atmospheric pressure.

In general, I correlate the hydrocarbon cooling agents, or mixtures thereof, with the pressure and the desired operating temperature so that, at any temperature above the nitration temperature, volatilization of the hydrocarbon takes place. It will, of course, be understood that the latent heat of vaporization of the hydrocarbons is relatively great so that very large quantities of heat are abstracted from the reaction mixture.

Alternatively, I can operate at pressures below atmospheric. This is desirable when, for economic reasons, such as availability of the hydrocarbon cooling agent, it is necessary to use normal pentane, or even hexane alone. Both of these substances have boiling points higher than normal nitration temperatures. By nitrating under reduced pressure, the boiling points are lowered. Normal pentane, for instance, boils at 25° C. under an absolute pressure of 9 pounds per square inch. Here again I am correlating the hydrocarbon with the pressure and desired nitrating temperature so that the hydrocarbon boils at the nitrating temperature.

Although the somewhat elaborate system of recovering and recycling my hydrocarbon cooling agent as shown in the drawing is generally advantageous, to secure good control and adequate refrigeration, it is possible to simplify the apparatus by substituting ordinary reflux condensers above kettle 1, separator 11, washer 25, etc.

What is claimed is:

1. The process of low temperature nitration of liquid aliphatic dihydroxy and polyhydroxy compounds of the glycol, and glycerine class which includes nitrating the hydroxy compound while admixed with a hydrocarbon in the liquid state, said hydrocarbon being unreactive with the nitrating acid at the temperature of the nitration and having a high vapor pressure at the temperature of the nitration, the hydrocarbon acting to control the nitration temperature by absorbing reaction heat and volatilizing.

2. The process of low temperature nitration of liquid aliphatic dihydroxy and polyhydroxy compounds of the glycol, and glycerine class which includes nitrating the hydroxy compound under pressure while admixed with a hydrocarbon in the liquid state, said hydrocarbon being unreactive with the nitrating acid at the temperature of the nitration and having a boiling point at atmospheric pressure less than the temperature of the nitration, the pressure, during the nitration, being sufficient to retain the hydrocarbon in the liquid state at the nitration temperature but permitting it to volatilize on an increase in temperature whereby the hydrocarbon acts to control the nitration temperature by absorbing reaction heat and volatilizing.

3. The process of low temperature nitration of liquid aliphatic dihydroxy and polyhydroxy compounds of the glycol, and glycerine class which includes nitrating the hydroxy compound under a pressure less than atmospheric while admixed with a hydrocarbon in the liquid state, said hydrocarbon being unreactive with the nitrating acid at the temperature of the nitration and having a boiling point at atmospheric pressure greater than the temperature of the nitration, the pressure, during nitration being such that the hydrocarbon is retained in the liquid state at the nitration temperature but permitting it to volatilize on an increase in temperature whereby the hydrocarbon acts to control the nitration temperature by absorbing reaction heat and volatilizing.

4. The process as in claim 1 wherein the volatilized hydrocarbon is continuously condensed and returned to the mixture undergoing nitration.

5. The process as in claim 2 wherein the volatilized hydrocarbon is continuously condensed and returned to the mixture undergoing nitration.

6. The process as in claim 3 wherein the volatilized hydrocarbon is continuously condensed and returned to the mixture undergoing nitration.

7. The process as in claim 1 wherein the hydrocarbon is a saturated aliphatic hydrocarbon.

8. The process as in claim 2 wherein the hydrocarbon is a saturated aliphatic hydrocarbon.

9. The process as in claim 3 wherein the hydrocarbon is a saturated aliphatic hydrocarbon.

10. The process as in claim 1 wherein the temperature of the reaction mixture is additionally controlled by cooling coils arranged therein.

11. The process as in claim 2 wherein the temperature of the reaction mixture is additionally controlled by cooling coils arranged therein.

12. The process as in claim 3 wherein the temperature of the reaction mixture is additionally controlled by cooling coils arranged therein.

13. The process of low temperature nitration of liquid aliphatic dihydroxy and polyhydroxy compounds of the glycol and glycerine class which includes nitrating the hydroxy compound at a temperature of 20° C. to 30° C. while admixed with a hydrocarbon in the liquid state, said hydrocarbon being unreactive with the nitrating acid at the nitrating temperature and having a high vapor pressure at this temperature, continuously condensing and returning volatilized hydrocarbon to the reaction mixture, separating the acid, after completion of the nitration, from the reaction products, separating the hydrocarbon from the reaction products and returning the hydrocarbon for re-use in the nitration of further quantities of hydroxy compounds, and washing and neutralizing the nitro compounds.

14. The process as in claim 13 wherein the nitration is conducted under a pressure in excess of atmospheric and the hydrocarbon used has a boiling point at atmospheric pressure less than the temperature of the nitration, the pressure during nitration being sufficient to retain the hydrocarbon in the liquid state at the temperature of the nitration but permitting it to volatilize on an increase in temperature.

15. The process as in claim 13 wherein the nitration is conducted under a pressure less than atmospheric and the hydrocarbon used has a boiling point at atmospheric pressure greater than the temperature of the nitration, the pressure during nitration being such that the hydrocarbon is retained in the liquid state but permitting it to volatilize on an increase in temperature.

16. The process as in claim 13 wherein the temperature of the reaction is additionally controlled by cooling coils therein.

17. The process of low temperature nitration of liquid aliphatic dihydroxy and polyhydroxy compounds of the glycol and glycerine class which includes nitrating the hydroxy compound at a temperature of 20° C. to 30° C. while admixed with a hydrocarbon in the liquid state, said hydrocarbon being unreactive with the nitrating acid at the nitrating temperature and having a high vapor pressure at this temperature, continuously condensing and returning volatilized hydrocarbon to the reaction mixture, separating the acid, after completion of the nitration, from the reaction products, separating most, but not all, of the hydrocarbon from the reaction products and returning the separated hydrocarbon for re-use in the nitration of further quantities of hydroxy compounds, washing the nitro compounds and remaining hydrocarbon with water, separating the hydrocarbon from the wash water and nitro compounds and returning the hydrocarbon for re-use, and finally washing the nitro compounds with dilute alkali to remove traces of acid.

18. The process as in claim 17 wherein the temperature of reaction is additionally controlled by cooling coils therein.

BRUCE K. BROWN.